US012722479B2

(12) United States Patent
Landvik et al.

(10) Patent No.: US 12,722,479 B2
(45) Date of Patent: Sep. 1, 2026

(54) SUSPENSION ARRANGEMENT FOR AN ENERGY STORAGE SYSTEM

(71) Applicant: VOLVO TRUCK CORPORATION, Gothenburg (SE)

(72) Inventors: Sondre Landvik, Gothenburg (SE); Sebastien Ragot, Gothenburg (SE)

(73) Assignee: VOLVO TRUCK CORPORATION, Gothenburg (SE)

(*) Notice: Subject to any disclaimer, the term of this patent is extended or adjusted under 35 U.S.C. 154(b) by 405 days.

(21) Appl. No.: 18/573,524

(22) PCT Filed: Jul. 6, 2021

(86) PCT No.: PCT/EP2021/068588
§ 371 (c)(1),
(2) Date: Dec. 22, 2023

(87) PCT Pub. No.: WO2023/280385
PCT Pub. Date: Jan. 12, 2023

(65) Prior Publication Data
US 2024/0294065 A1 Sep. 5, 2024

(51) Int. Cl.
*B60K 15/07* (2006.01)
*B60L 50/71* (2019.01)
(Continued)

(52) U.S. Cl.
CPC .............. *B60K 15/07* (2013.01); *B60L 50/71* (2019.02); *B60R 16/04* (2013.01); *B60K 2015/03151* (2013.01)

(58) Field of Classification Search
CPC .................. B60K 15/07; B60K 15/067; B60K 2015/03151; B60K 2015/0634; B60K 2001/0444; B60L 50/71; B60R 16/04
See application file for complete search history.

(56) References Cited

U.S. PATENT DOCUMENTS 10,589,788 B1 * 3/2020 Milton .................. B62D 21/02
12,090,839 B2 * 9/2024 Iijima .................. B60K 15/067
(Continued)

FOREIGN PATENT DOCUMENTS

DE 202007015487 U1 3/2009
DE 102011103989 A1 4/2012
(Continued)

OTHER PUBLICATIONS

International Search Report and Written Opinion of the International Searching Authority in corresponding International Application No. PCT/EP2021/068588 mailed Mar. 28, 2022 (14 pages).

*Primary Examiner* — Brian L Swenson
(74) *Attorney, Agent, or Firm* — Jeffri A. Kaminski; Venable LLP

(57) ABSTRACT

A suspension arrangement is provided for an energy storage system of a vehicle comprising a frame. The suspension arrangement includes a set of first bracket portions, wherein the first bracket portions are spaced apart from each other and connectable to a first portion of the frame; a set of second bracket portions. Each second bracket portion is connected to a respective one of the first bracket portions by a first stretchable connector arrangement to form a first encircling portion configured to suspend a first gas tank. A set of third bracket portions is provided, wherein each third bracket portion is connected to a respective one of the first bracket portions by a second stretchable connector arrangement to form a second encircling portion configured to suspend a second gas tank, the set of third bracket portions being arranged on an opposite side of the set of first bracket portions compared to the position of the set of second bracket portions.

15 Claims, 4 Drawing Sheets

(51) Int. Cl.

| | |
|---|---|
| ***B60R 16/04*** | (2006.01) |
| *B60K 15/03* | (2006.01) |

(56) References Cited

U.S. PATENT DOCUMENTS

| | | | | |
|---|---|---|---|---|
| 12,435,832 | B2 * | 10/2025 | Schmidt-Sunnus | B60K 1/04 |
| 12,502,942 | B1 * | 12/2025 | Murphy | B60K 1/04 |
| 2016/0082910 | A1 | 3/2016 | Sloan et al. | |
| 2019/0263450 | A1 * | 8/2019 | Inoue | B62D 21/152 |
| 2021/0188069 | A1 * | 6/2021 | Friedman | B62D 27/06 |
| 2021/0260994 | A1 * | 8/2021 | Gambone | B60K 15/067 |
| 2021/0387519 | A1 * | 12/2021 | Landvik | H01M 50/244 |
| 2022/0410686 | A1 * | 12/2022 | Kumagai | B62D 21/09 |
| 2023/0001986 | A1 * | 1/2023 | Hendriks | B60K 1/04 |
| 2023/0202282 | A1 * | 6/2023 | Ragot | B60L 50/66 180/68.5 |
| 2024/0166040 | A1 * | 5/2024 | Coupal-Sikes | H01M 50/204 |
| 2025/0316821 | A1 * | 10/2025 | Landvik | H01M 50/258 |

FOREIGN PATENT DOCUMENTS

| | | | |
|---|---|---|---|
| DE | 102017005448 | A1 | 12/2017 |
| DE | 102018125034 | A1 | 5/2019 |
| EP | 3496966 | A1 | 6/2019 |
| EP | 3680150 | A1 | 7/2020 |
| WO | 2018030931 | A1 | 2/2018 |
| WO | 2021126455 | A1 | 6/2021 |

* cited by examiner

SUSPENSION ARRANGEMENT FOR AN ENERGY STORAGE SYSTEM

CROSS-REFERENCE TO RELATED APPLICATIONS

This application is a U.S. National Stage application of PCT/EP2021/068588, Jul. 6, 2021 and published on Jan. 12, 2023 as WO 2023/280385, all of which is hereby incorporated by reference in its entirety.

TECHNICAL FIELD

The present invention relates to a suspension arrangement for an energy storage system. The energy storage system is preferably formed by a gas tanks in the form of pressure vessels. The present invention also relates to a chassis arrangement comprising such a suspension arrangement and a vehicle comprising a chassis arrangement. Although the invention will mainly be directed to a vehicle in the form of a truck using a fuel cell for generating electric power to an electric traction motor, the invention may also be applicable for other types of vehicle comprising energy storage systems.

BACKGROUND

The propulsion systems of vehicles are continuously developed to meet the demands from the market. A particular aspect relates to the emission of environmentally harmful exhaust gas. Therefore, vehicles propelled by electric machines have been increasingly popular, both for cars as well as for trucks and other heavy duty vehicles.

In relation to heavy duty vehicles, fuel cell systems are increasingly popular for generating the electric power to the electric machines. The electric power generated by the fuel cell system is either supplied to a vehicle battery, or directly provided to the electric machine. The fuel cell system receives a fuel e.g. hydrogen to be able to generate the electric power. The fuel is contained in gas tanks connected to the vehicle. The gas tanks and batteries can be referred to as the energy storage system.

In order to cover a long driving range without having to frequently re-fuel the tanks or charge the batteries, the energy storage systems are relatively large. There is however limited space at the vehicle for positioning of such large energy storage systems, in particular with regards to the gas tanks which are conventionally of cylindrical cross-section and thus rather bulky. Also, gas tanks have a tendency to expand due to the relatively high working pressure, which needs to be taken into consideration when connecting the gas tanks to the vehicle.

SUMMARY

It is thus an object of the present invention to at least partially overcome the above described deficiencies.

According to a first aspect, there is provided a suspension arrangement for an energy storage system of a vehicle comprising a frame, the suspension arrangement comprising a set of first bracket portions, wherein the first bracket portions are spaced apart from each other and connectable to a first portion of the frame; a set of second bracket portions, wherein each second bracket portion is connected to a respective one of the first bracket portions by a first stretchable connector arrangement to form a first encircling portion configured to suspend a first gas tank; and a set of third bracket portions, wherein each third bracket portion is connected to a respective one of the first bracket portions by a second stretchable connector arrangement to form a second encircling portion configured to suspend a second gas tank, the set of third bracket portions being arranged on an opposite side of the set of first bracket portions compared to the position of the set of second bracket portions.

The bracket portions are brackets which, together with another bracket portion, arranged to suspend a gas tank. As described above, the first bracket portions are spaced apart from each other. It should thus be understood that the first bracket portions are spaced apart along a longitudinal direction of the frame when the suspension arrangement is connected to the first portion of the frame. In further detail, the first bracket portions are connected to a respective second bracket portion along a first direction. The first direction is preferably transversal to the longitudinally extending frame. The first bracket portions are preferably spaced from each other along a second direction, which second direction is perpendicular to the first direction. Hence, the first bracket portions are preferably spaced apart from each other in a direction perpendicular to an extension of the first stretchable connector arrangement.

The stretchable connector arrangements should be construed as arrangements which are arranged to secure that the gas tanks are maintained at their intended position. The wording "stretchable" should be construed such that the stretchable connector arrangements allow for an expansion of the gas tanks. Hence, the stretchable connector arrangements can preferably expand. For example, the first stretchable connector arrangement allows for a mutual displacement between the first and second bracket portions when the first gas tank expand its diameter due to various reasons. According to an example embodiment, each of the first and second stretchable connector arrangements may comprise a stretchable strap, respectively. The first and second stretchable connector arrangements may each comprise a stretchable connector element in the form of e.g. the above described stretchable strap. However, the first and second stretchable connector arrangements may alternatively comprise a non-stretchable and a spring element, where the connector element is connected to the spring element, and the spring element is connected to at least one of the first and second bracket portions. In the latter example, the stretchable connector arrangement is stretchable by means of the spring element.

The present invention is based on the insight that the gas tanks tend to expand radially during operation, in particular for case where the gas tanks are provided in the form of composite overwrapped pressure vessels. In particular, the relatively high operating pressure within the gas tanks will expand the tanks. An advantage of the present invention is thus that the first and second stretchable connector arrangements provides for a flexible attachment of the gas tanks, thereby reducing tank stresses that would otherwise occur due to the high pressure variations within the tank. The stretchable connector arrangements hereby allow for a mutual displacement between the set of first bracket portions and the set of second bracket portions, as well as between the set of first bracket portions and the set of third bracket portions.

Furthermore, the invention as described above, enables for an efficient pre-assembly stage of an energy storage system before the suspension arrangement together with energy storage system. This may increase the productivity in the assembly line of production. Also, pre-assembling of the suspension arrangement together with the energy storage system, compared to mounting the energy storage system to a suspension arrangement already connected to the vehicle, enables for the use of larger energy storage systems since the need for clearance when while docking is no longer necessary. Hence, the total available packaging space of the vehicle is more efficiently utilized. Larger energy storage system enables in turn for increased driving range of the vehicle.

According to an example embodiment, the suspension arrangement may further comprise an elongated connecting element, the first bracket portions being connected to the elongated connecting element at a distance from each other.

Preferably, and according to an example embodiment, the elongated connecting element may be configured to be connected to the first portion of the frame of the vehicle. Further, and according to an example embodiment, the elongated connecting element may be an extruded beam profile. The first bracket portion are hereby attached to, and hangs in, the elongated connecting element. The elongated connecting element may either be attached to the first portion of the frame, whereafter the set of first bracket portions is connected the elongated connecting element and the tanks are connected to between the bracket portions. The elongated connecting element may also in a first step be connected to the set of first bracket portions, whereafter the assembly including the elongated connecting element and the set of first bracket portions is connected to the first portion of the frame.

According to an example embodiment, the suspension arrangement may further comprise a plurality of bushings arranged on the elongated connecting element and connectable to the first portion of the frame. Hereby, an element with damping properties is arranged between the elongated connecting element and the first portion of the frame. The bushings should thus be construed as an element acting as a vibration isolator. The bushings can be formed by a plurality of various materials, such as rubber, metal, etc. The bushings can also be formed by a spring or a screw with sufficient clamp length.

According to an example embodiment, each of the first bracket portions may be configured to assume a first and a second connection state to the elongated connecting element, wherein each of the first bracket portions is fixated to the elongated connecting element when assuming the first connection state, and slidable along the elongation of the elongated connecting element when assuming the second connection state.

Hereby, each of the first bracket portions can slide along the elongated connecting element. An advantage is that the mutual displacement between the first bracket portions can be adjusted and thereby providing a suitable fit for various types of gas tanks, i.e. gas tanks of different length.

According to an example embodiment, the suspension arrangement may further comprise a battery suspension arrangement connectable to a second portion of the frame of the vehicle.

An advantage is that the battery suspension arrangement in conjunction with the bracket portions, is that a well-balanced suspension arrangement is provided. In further detail, when one or more battery modules are attached to the battery suspension arrangement and gas tanks are attached to the set of first, second and third bracket portions, the load from the gas tanks and the battery module(s) is well balanced to the frame. Also, one large unit containing battery modules as well as gas tanks is provided. Further, providing battery modules together with the gas tanks provides an arrangement suspended as one large volume. This will reduce the acceleration levels in the installed components, allowing rougher road conditions.

According to an example embodiment, the battery suspension arrangement may be connected to the set of third bracket portions, the battery suspension arrangement being arranged on an opposite side of the set of third bracket portions compared to the position of the set of first bracket portions. Thus, a uniform arrangement is provided.

According to an example embodiment, the battery suspension arrangement and the set of third bracket portions may form a third encircling portion for housing a third gas tank. Hereby, even further gas tanks may be attached to the suspension arrangement, thereby enabling for an even further extending operating range for operating the vehicle before re-fueling.

According to an example embodiment, the suspension arrangement may further comprise a second elongated connecting element arranged on the battery suspension arrangement, wherein the second elongated connecting element is configured to be connected to the second portion of the frame. The battery suspension may also be slidingly connected to the second elongated connecting element in a similar vein as the connection between the set of first bracket portions and the first elongated connecting element.

According to an example embodiment, the suspension arrangement may further comprise a second plurality of bushings arranged on the second elongated connecting element and connectable to the second portion of the frame. The bushings may be formed by similar materials as the bushings connected to elongated connecting element for the set of first bracket portions.

According to an example embodiment, the suspension arrangement may further comprise a vertical crash protection plate connected to the set of second bracket portions. Hereby, loads exposed to the suspension arrangement can be absorbed by the bracket portions, thereby protecting the gas tanks from damage. According to an example embodiment, the vertical crash protection plate may be arranged on an opposite side of the second bracket portions compared to the position of the first bracket portions. The suspension arrangement may also comprise a vertical crash protection plate connected to the battery suspension arrangement. Such vertical crash protection plate is thus arranged on the outer end portion of the battery suspension arrangement.

According to an example embodiment, the suspension arrangement may further comprise a stiffness increasing plate connected to the set of first bracket portions and to the set of second bracket portions, the stiffness increasing plate is arranged at a position below the first stretchable connector arrangement when the suspension arrangement is connected to the frame. The stiffness increasing plate also has the advantageous effect of protecting the energy storage system from debris from below.

According to a second aspect, there is provided a chassis arrangement for a vehicle at least partially propelled by an electric traction motor, the chassis arrangement comprising a frame, a first and a second gas tank, each of the first and second gas tanks being configured to supply gas to a fuel cell system, wherein the fuel cell system is configured to generate electric power to the electric traction motor, and a suspension arrangement according to any one of the embodiments described above in relation to the first aspect, the suspension arrangement being connected to a first portion of the frame, wherein the first gas tank is arranged between the first and second bracket portions and the second gas tank is arranged between the first and third bracket portions.

Effects and features of the second aspect are largely analogous to those described above in relation to the first aspect.

According to a third aspect, there is provided a vehicle, comprising an electric traction motor and a chassis arrangement according to the second aspect.

Effects and features of the third aspect are largely analogous to those described above in relation to the first aspect.

Further features of, and advantages will become apparent when studying the appended claims and the following description. The skilled person will realize that different features may be combined to create embodiments other than those described in the following, without departing from the scope of the present disclosure.

BRIEF DESCRIPTION OF THE DRAWINGS

The above, as well as additional objects, features, and advantages, will be better understood through the following illustrative and non-limiting detailed description of exemplary embodiments, wherein.

DETAILED DESCRIPTION

Figure 1:
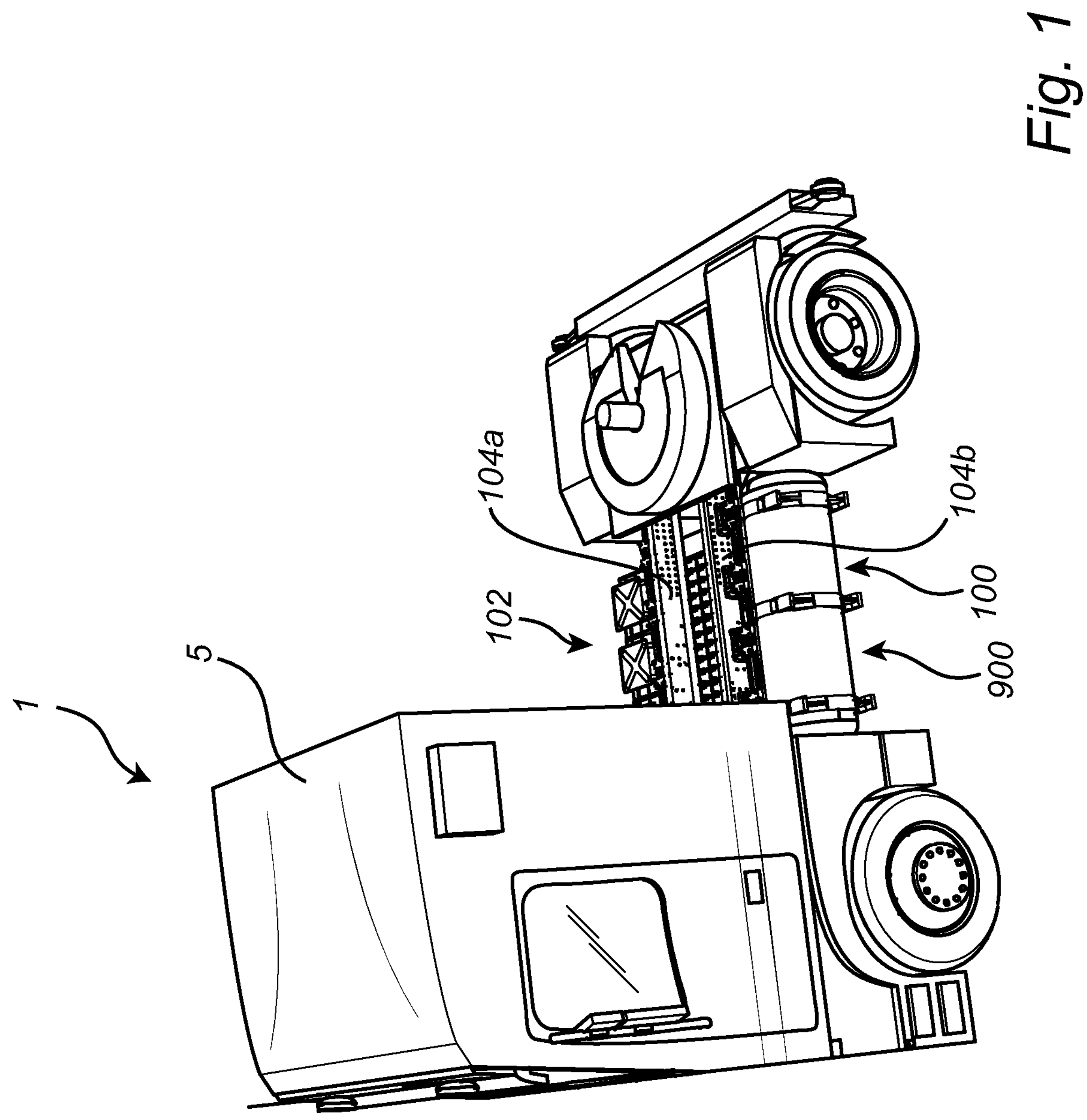
FIG. 1 is a lateral side view illustrating an example embodiment of a vehicle in the form of a truck.

The present invention will now be described more fully hereinafter with reference to the accompanying drawings, in which exemplary embodiments are shown. The invention may, however, be embodied in many different forms and should not be construed as limited to the embodiments set forth herein; rather, these embodiments are provided for thoroughness and completeness. Like reference character refer to like elements throughout the description.

FIG. 1 is a perspective view of a vehicle 1 in the form of a truck. The vehicle comprises a cab 5 in which a driver controls operation of the vehicle. The vehicle is preferably propelled by means of one or more electric traction motors, preferably in the form of electric motors which receives electric power from one or more batteries or one or more fuel cells. The following will describe the vehicle 1 the form of a fuel cell truck which comprises one or more hydrogen tanks arranged to contain hydrogen for operating the fuel cell(s). The vehicle may also, in addition or as an alternative, comprise one or more vehicle batteries.

As is further illustrated in FIG. 1, the vehicle 1 comprises a chassis arrangement 900, wherein the chassis arrangement comprises a chassis comprising a first chassis portion 104*a*, and a second chassis portion 104*b*. In the following, the first and second chassis portions are referred to as a pair of longitudinally extending frame rails 104*a*, 104*b*. The chassis arrangement further comprises a suspension arrangement 100 connected to the pair of longitudinally extending frame rails 104*a*, 104*b*. The suspension arrangement 100 is suspending an energy storage system 102, here illustrated as comprising gas tanks and battery modules, and will be described in further detail below with reference to FIGS. 2-5.

Figure 2:
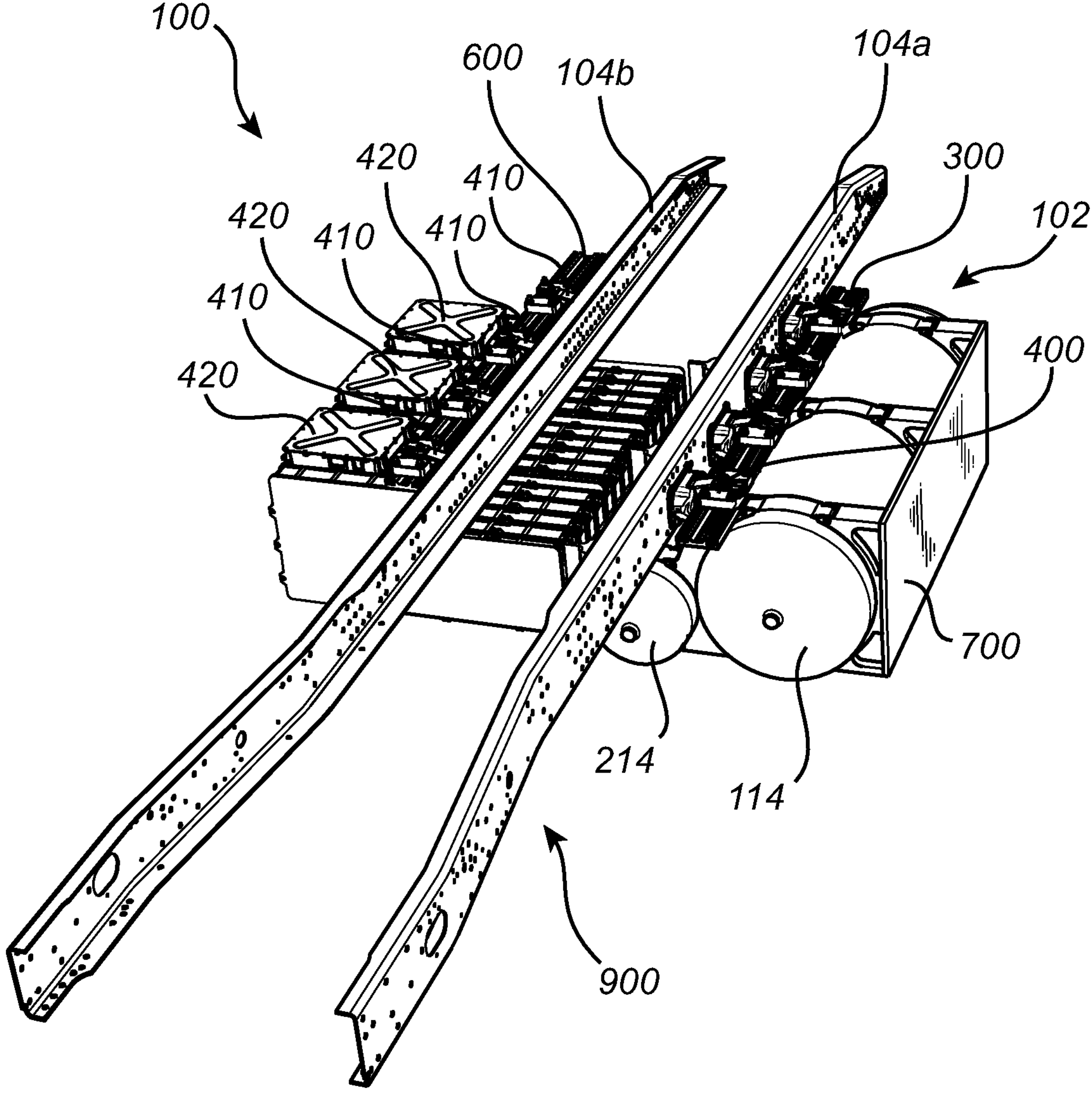
FIG. 2 is a schematic illustration of a suspension arrangement connected to a frame of the vehicle according to an example embodiment.

Reference is made to FIG. 2, which is a schematic illustration of a suspension arrangement connected to longitudinally extending frame rails of the vehicle according to an example embodiment. As can be seen in FIG. 2, the suspension arrangement 100 suspends the energy storage system 102 comprising a first gas tank 114, a second gas tank 214 and a plurality of battery modules 420. The first 114 and second 214 gas tanks are arranged at a first one 104*a* of the longitudinally extending frame rails and the battery modules 420 are arranged at a second one 104*b* of the longitudinally extending frame rails.

The first 114 and second 214 gas tanks are connected to the first longitudinally extending frame rail 104*a* by means of bracket portions connected to an elongated connecting element 300 via bushings 400, while the battery modules are connected to the second longitudinally extending frame rail 104*b* by means of a battery suspension arrangement connected to a second elongated connecting element 600 via bushings 410.

Furthermore, the suspension arrangement 100 also comprises a vertical crash protection plate 700. The vertical crash protection plate 700 is connected to the set of second bracket portions 120 and can be formed by a single vertical crash protection plate 700 connected to each of the second bracket portions 120, or a plurality of vertical crash protection plates, where each one of the vertical crash protection plates is connected between a pair of second bracket portions. The vertical crash protection plate 700 is connected at the transversal end portion of the second bracket portions, i.e. the side of the second bracket portions 120 facing away from the first bracket portions 110. Although not depicted in FIG. 2, the suspension arrangement 100 may also comprise a vertical crash protection plate at the battery modules, i.e. on the side of the battery modules facing away from the gas tanks.

Figure 3:
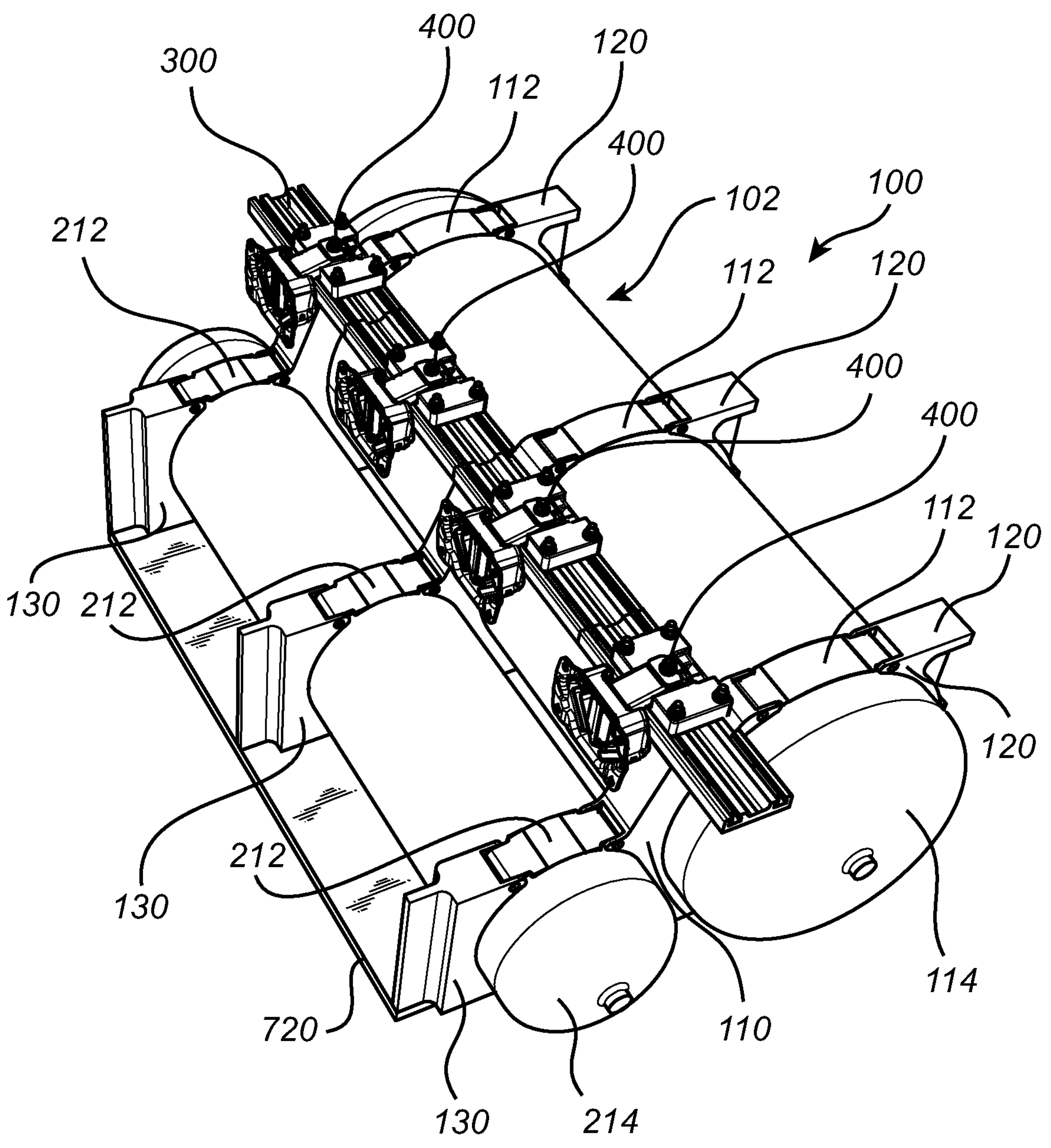
FIG. 3 is a perspective view of the suspension arrangement according to an example embodiment.

In order to describe the suspension arrangement 100 in further detail, reference is made to FIG. 3 which is a perspective view of the suspension arrangement according to a first example embodiment.

The suspension arrangement 100 comprises a set of first bracket portions 110. In the example embodiment depicted in FIG. 3, the set of first bracket portions 110 comprises three first bracket portions 110 spaced apart from each other along the elongated connecting element 300. The first bracket portions 110 are each connected to the elongated connecting element 300, which elongated connecting element 300 in turn is connected to the first longitudinally extending frame rail 104*a* as described above. In detail, the elongated connecting element 300 is connected to the first longitudinally extending frame rail 104*a* by means of connector elements which comprises bushings for reducing vibrations from the first longitudinally extending frame rail 104*a* to propagate into the gas tanks. As can be seen in FIG. 3, the elongated connecting element 300 is arranged as an extruded beam profile.

The suspension arrangement 100 further comprises a set of second bracket portions 120. As can be seen in FIG. 3, each one of the second bracket portions 120 is connected to a respective first bracket portion 110. In particular, each second bracket portion 120 is connected to a respective one of the first bracket portions 110 by a first stretchable connector arrangement 112. A first gas tank 114 is hereby positioned between the set of first 110 and second 120 bracket portions. The first stretchable connector arrangement 112 is arranged above the first gas tank 114. It should however be readily understood that a stretchable connector arrangement 112 can be connected between each first 110 and second 120 bracket portions at a position below first gas tank 114. As an alternative, the first 110 and second 120 bracket portions can be connected to each other by one first stretchable connector arrangement 112, for example positioned above the first gas tank 114 as shown in FIG. 3, and by a hinge on an opposite side of the first gas tank 114. In FIG. 3, the first stretchable connector arrangement 112 is depicted as a stretchable strap. However, the first stretchable connector arrangement 112 may comprise a spring element (not shown) in combination with a non-stretchable strap, where the spring element is connected to at least one of the first 110 and second 120 bracket portions. By means of the first stretchable connector arrangement 112, a first encircling portion (101 in FIG. 4) is formed in which the first gas tank 114 is suspended.

The suspension arrangement 100 further comprises a set of third bracket portions 130. Each of the third bracket portions 130 is connected to a respective one of the first bracket portions 110 by a second stretchable connector arrangement 212. A second gas tank 214 is hereby positioned between the set of first 110 and third 130 bracket portions. In a similar vein as described above, a stretchable connector arrangement can also connect the third 130 and first 110 bracket portions to each other at a position below the second gas tank 214, or connected to each other using a hinge in combination with the second stretchable connector arrangement 212. By means of the second stretchable connector arrangement 212, a second encircling portion (201 in FIG. 4) is formed in which the second gas tank 214 is suspended.

Accordingly, the set of second bracket portions 120 and the set of third bracket portions 130 are connected to the set of first bracket portions 110, which set of first bracket portions 110 is attached to the first longitudinally extending frame rail 104*a*.

Furthermore, each of the first bracket portions 110 may be slidingly connected to the elongated connecting element 300. Hereby, the mutual displacement between each of the first bracket portions 110 can be adjusted based on the dimensions of the first 114 and second 214 gas tanks. When adjusting the mutual displacement between the first bracket portions 110, the mutual displacement between the second bracket portions is adjusted in a similar manner. The same applies for the third bracket portions 130. Accordingly, each of the first bracket portions 110 is configured to assume a first connection state to the elongated connecting element in which the first bracket portion 110 is fixated, i.e. non-slidable, to the elongated connecting element 300. The first bracket portions 110 can also assume a second connection state to the elongated connecting element 300 in which the first bracket portion is non-fixated, i.e. slidable, to the elongated connecting element 300. In the second connection state, the first bracket portion 300 can thus slide along the extension of the elongated connecting element 300.

Still further, in order to increase the stiffness of the suspension arrangement 100, a stiffness increasing plate 720 is connected to the bracket portions at a lower end thereof. The stiffness increasing plate 720 is preferably connected to the set of first bracket portions 110 and the set of second bracket portions 120, but can also be connected to the set of third bracket portions 130 as well as to the battery suspension arrangement (500 in FIG. 4). The stiffness increasing plate 720 also protects the battery modules and gas tanks from debris from below.

Figure 4:
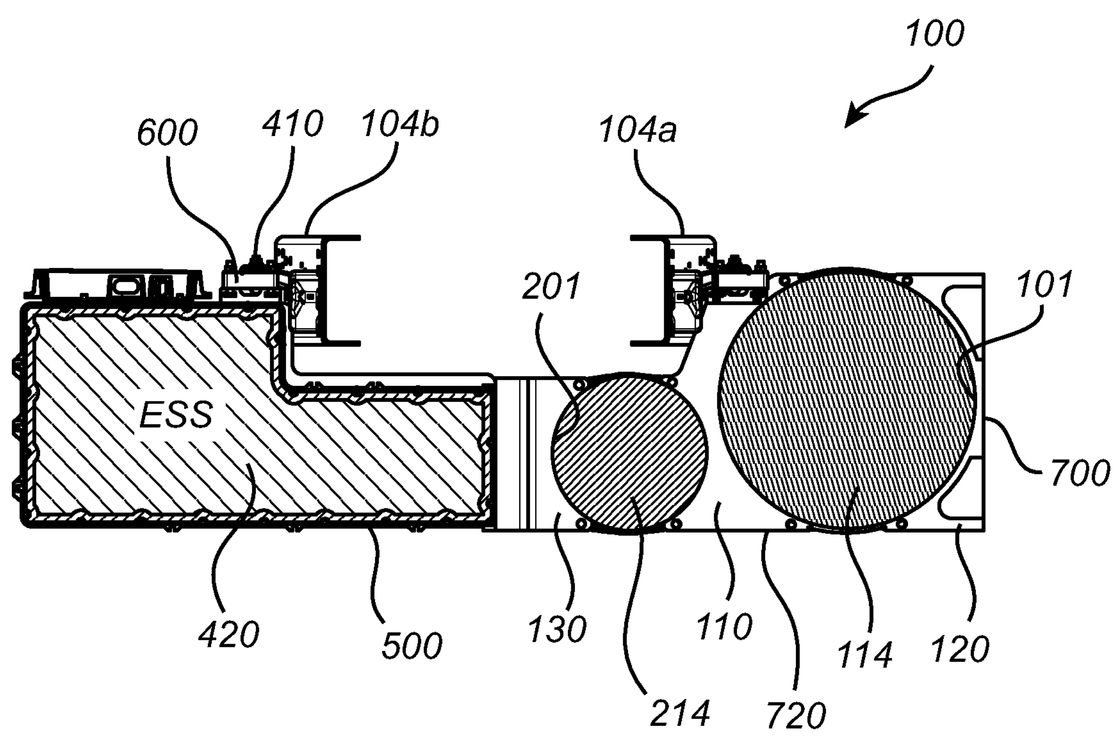
FIG. 4 is a rear view of the suspension arrangement according to an example embodiment.

Reference is now made to FIG. 4 which is a rear view of the suspension arrangement 100 according to an example embodiment. In the FIG. 4 embodiment, the suspension arrangement 100 further comprises a battery suspension arrangement 500. The battery suspension arrangement 500 is connected to the second one of the longitudinally extending frame rails 104*b* of the vehicle 1. The battery suspension arrangement 500 is suspending the battery modules 420 described above in relation to FIG. 2.

As depicted in FIG. 4, the battery suspension arrangement 500 is connected set of third bracket portions 130 as well as to a second elongated connecting element 600, where the second elongated connecting element is connected to the second one of the frame rails 104*b*. The battery suspension arrangement 500 is thus arranged on an opposite side of the set of third bracket portions compared to the position of the set of first bracket portions.

As further illustrated in FIG. 4, a second plurality of bushings 410 is arranged on the second elongated connecting element 600. The second plurality of bushings 410 is connected to the second one of the frame rails 104*b*. The second plurality of bushings 410 can be of the same type as the bushings connected to the elongated connecting element 300 connecting the set of first bracket portions 110 to the first frame rail 104*a*.

Figure 5:
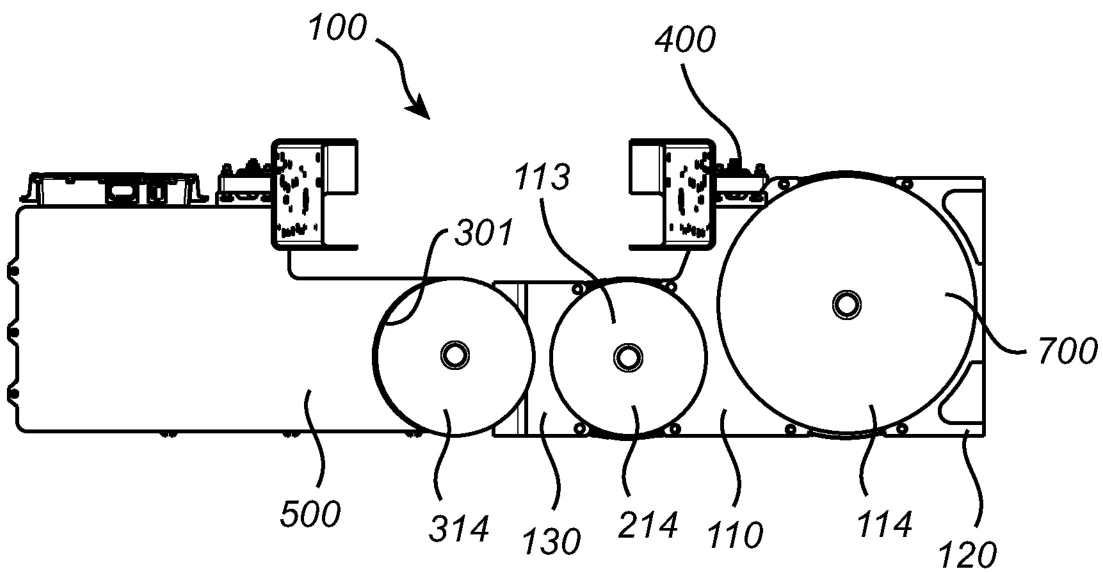
FIG. 5 is a rear view of the suspension arrangement according to another example embodiment.

Finally, reference is made to FIG. 5 which is a rear view of the suspension arrangement 100 according to another example embodiment. As can be seen in FIG. 5, the battery suspension arrangement 500 and the set of third bracket portions 130 are forming a third encircling portion 301. Hereby, a third gas tank 314 can be suspended by the suspension arrangement 100. It should be readily understood that the third gas tank 314 can equally as well be connected to the battery suspension arrangement 500 by means of a bracket portion in a similar vein as illustrated between the second gas tank 214 and the battery suspension arrangement in FIG. 4. In such case, the battery suspension arrangement 500 does not form an encircling portion, but has instead a substantially straight vertical end side which is connected to the additional bracket portion.

It should be readily understood that the features of the various embodiments can be combined. For example, the stiffness increasing plate 720 can be included in the embodiments of FIGS. 3 and 5, etc.

It is to be understood that the present disclosure is not limited to the embodiments described above and illustrated in the drawings; rather, the skilled person will recognize that many changes and modifications may be made within the scope of the appended claims.

The invention claimed is:

1. A suspension arrangement for an energy storage system of a vehicle comprising a frame, the suspension arrangement comprising:

a set of first bracket portions, wherein the first bracket portions are spaced apart from each other and connectable to a first portion of the frame;

a set of second bracket portions, wherein each second bracket portion is connected to a respective one of the first bracket portions-by a first stretchable connector arrangement-to form a first encircling portion configured to suspend a first gas tank; and a set of third bracket portions, wherein each third bracket portion-is connected to a respective one of the first bracket portions-by a second stretchable connector arrangement to form a second encircling portion configured to suspend a second gas tank, the set of third bracket portions-being arranged on an opposite side of the set of first bracket portions compared to the position of the set of second bracket portions, wherein the suspension arrangement further comprises a battery suspension arrangement connectable to a second portion of the frame of the vehicle, wherein the battery suspension arrangement is connected to the set of third bracket portions, the battery suspension arrangement being arranged on an opposite side of the set of third bracket portions compared to the position of the set of first bracket portions.

2. The suspension arrangement according to claim 1, wherein the suspension arrangement further comprises an elongated connecting element, the first bracket portions being connected to the elongated connecting element at a distance from each other.

3. The suspension arrangement according to claim 2, wherein the elongated connecting element is configured to be connected to the first portion of the frame of the vehicle.

4. The suspension arrangement according to claim 3, further comprises a plurality of bushings arranged on the elongated connecting element and connectable to the first portion of the frame.

5. The suspension arrangement according to claim 2, wherein each of the first bracket portions is configured to assume a first and a second connection state to the elongated connecting element, wherein each of the first bracket portions is fixated to the elongated connecting element when assuming the first connection state, and slidable along the elongation of the elongated connecting element when assuming the second connection state.

6. The suspension arrangement according to claim 2, wherein the elongated connecting element is an extruded beam profile.

7. The suspension arrangement according to claim 1, wherein each of the first and second stretchable connector arrangements comprises a stretchable strap, respectively.

8. The suspension arrangement according to claim 1, wherein the battery suspension arrangement and the set of third bracket portions are forming a third encircling portion for housing a third gas tank.

9. The suspension arrangement according to any claim 1, further comprising a second elongated connecting element arranged on the battery suspension arrangement, wherein the second elongated connecting element is configured to be connected to the second portion of the frame.

10. The suspension arrangement according to claim 1, further comprising a second plurality of bushings arranged on the second elongated connecting element and connectable to the second portion of the frame.

11. The suspension arrangement according to claim 1, further comprising a vertical crash protection plate connected to the set of second bracket portions.

12. The suspension arrangement according to claim 11, wherein the vertical crash protection plate is arranged on an opposite side of the second bracket portions compared to the position of the first bracket portions.

13. The suspension arrangement according to claim 1, further comprises a stiffness increasing plate connected to the set of first bracket portions and to the set of second bracket portions, the stiffness increasing plate is arranged at a position below the first stretchable connector arrangement when the suspension arrangement is connected to the frame.

14. A chassis arrangement for a vehicle at least partially propelled by an electric traction motor, the chassis arrangement comprising:

a frame, a first and a second gas tank, each of the first and second gas tanks being configured to supply gas to a fuel cell system, wherein the fuel cell system is configured to generate electric power to the electric traction motor, and a suspension arrangement according to claim 1, the suspension arrangement being connected to a first portion of the frame, wherein the first gas tank is arranged between the first and second bracket portions and the second gas tank is arranged between the first and third bracket portions.

15. A vehicle, comprising an electric traction motor and a chassis arrangement according to claim 14.

* * * * *